United States Patent
Drabarek et al.

(10) Patent No.: US 6,243,169 B1
(45) Date of Patent: *Jun. 5, 2001

(54) INTERFEROMETRIC INSTRUMENT PROVIDED WITH AN ARRANGEMENT FOR PERIODICALLY CHANGING A LIGHT PATH OF A RECEIVED BEAM COMPONENT

(75) Inventors: Pawel Drabarek, Tiefenbronn; Goetz Kuehnle, Hemmingen, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,831

(22) Filed: May 26, 1998

(30) Foreign Application Priority Data

May 26, 1997 (DE) ............................................. 197 21 842

(51) Int. Cl.⁷ ........................................................ G01B 9/02
(52) U.S. Cl. ............................ 356/489; 356/511; 356/497
(58) Field of Search ...................................... 356/345, 349, 356/351, 357, 359, 360, 489, 511, 512, 479, 497

(56) References Cited

U.S. PATENT DOCUMENTS 5,321,501 * 6/1994 Swanson et al. .................... 356/345

FOREIGN PATENT DOCUMENTS

| 39 06 118 | 8/1990 | (DE) . |
| 41 08 944 | 9/1992 | (DE) . |
| 43 36 318 | 4/1995 | (DE) . |
| 195 22 262 | 1/1997 | (DE) . |
| 2 325 737 | 12/1998 | (GB) . |

OTHER PUBLICATIONS

T. Dressel et al,"Three–Dimensional Sensing Of Rough Surfaces By Coherence Radar", Applied Optics, vol. 31, No. 7, Mar. 1, 1992, pp. 919–925.

* cited by examiner

*Primary Examiner*—Samuel A. Turner
(74) *Attorney, Agent, or Firm*—Kenyon & Kenyon

(57) ABSTRACT

An interferometric instrument for sensing the surfaces of a test object includes a radiation generating unit for emitting briefly coherent radiation and a first beam splitter for producing a first beam component and a second beam component. One beam component is aimed at the surface of the test object, and the other beam component is aimed at a device with a reflecting element for periodically changing the light path. The instrument also has an interference element which causes the radiation coming from the surface and the radiation coming from the device to interfere with one another, and a photodetector which receives the radiation. With a simple design, it is possible to increase the measuring accuracy by providing the device for changing the light path with an arrangement producing a parallel shift positioned in the optical path, followed by a stationary reflecting element.

5 Claims, 1 Drawing Sheet

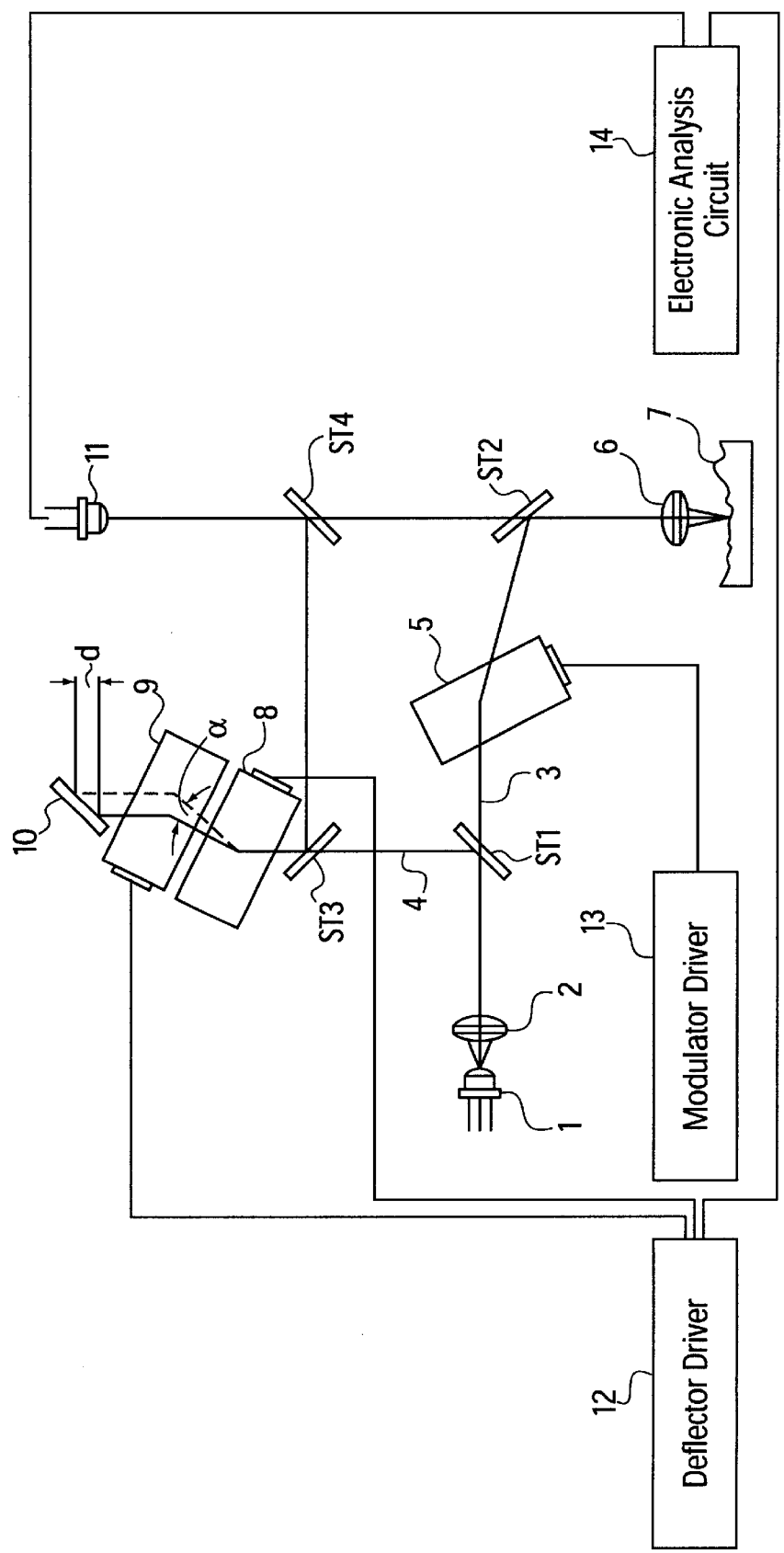

INTERFEROMETRIC INSTRUMENT PROVIDED WITH AN ARRANGEMENT FOR PERIODICALLY CHANGING A LIGHT PATH OF A RECEIVED BEAM COMPONENT

FIELD OF THE INVENTION

The present invention relates to an interferometric instrument for scanning the rough surfaces of a test object. The present invention includes a radiation generating unit, which emits briefly coherent radiation, and a first beam splitter, which produces a first and second beam component. According to the present invention, one beam component is aimed at the surface to be sensed, and the other beam component is aimed at a device with a reflecting element for periodically changing the light path. The interferometric instrument of the present invention further includes an interference element, which causes the radiation coming from the surface and the radiation coming from the reflecting device to interfere with one another, and a photodetector which receives the radiation.

BACKGROUND INFORMATION

A known interferometric instrument is described in the publication by T. Dresel, G. Häusler, H. Vanzke entitled "Three-Dimensional Sensing of Rough Surfaces by Coherence Radar," Appl. Opt., Vol. 3, No. 7, dated Mar. 1, 1992. This publication proposes an interferometer with a briefly coherent light source and a piezoelectric mirror for sensing rough surfaces. In the measuring instrument, a first beam component in the form of a light wave radiated back from a test object has a second beam component in the form of a reference wave superimposed upon it. The two light waves have a very short coherence length (just a few $\mu$m) so that the interference contrast reaches its maximum when the optical path difference is zero. A reflecting element in the form of a piezoelectric mirror is provided for changing the light path of the reference wave. The distance to the test object can be determined by comparing the position of the piezoelectric mirror with the time at which the interference maximum occurs. However, the precise measurement of the position of this piezoelectric mirror is relatively complicated.

SUMMARY OF THE INVENTION

An object of the present invention is to provide an interferometric instrument having a simplified layout and capable of achieving an increased measuring accuracy.

In order to achieve this object, the interferometric instrument of the present invention includes a device for changing a light path of a received beam component. This device has an arrangement for producing a parallel shift and positioned in an optical path of one of the first and second beam components. This arrangement is followed by a stationary reflecting element. This layout avoids the need to provide a mechanically driven element, thus making it possible to achieve a simple and more accurate analysis.

According to an embodiment of the present invention, the arrangement for producing the parallel shift has an acousto-optical deflector arrangement that is positioned in the optical path of one of the first and second beam components. This acousto-optical deflector arrangement is followed by the stationary reflecting element or by an element for deflecting the second beam component. The acousto-optical deflector arrangement is frequency-modulated and positioned in relation to the incoming beam component and in relation to the reflecting element so that the second beam component supplied to the interference element undergoes a change in its light path when it is deflected in the acousto-optical deflector arrangement. The acousto-optical deflector arrangement, in combination with the stationary reflecting element that follows it, is used to produce a change in the light path without any mechanical movement, simply by modulating the driving frequency of the acousto-optical deflector arrangement. At the same time, knowledge of the modulation frequency makes it possible to easily detect the light path, thus determining the distance to the test object by measuring the interference maximum.

In the interferometric instrument of the present invention, the acousto-optical deflector arrangement includes a first acousto-optical deflector and a second acousto-optical deflector that are positioned consecutively in the optical path. The first acousto-optical deflector deflects the second beam component around an angle by an angular deflection that is variable over time as a function of the frequency, while the second acousto-optical deflector resets the angular deflection so that the second beam component continues to move in the direction of incidence parallel to the first acousto-optical deflector. The reflecting element includes a diffraction grating oriented at an angle to the second beam component leaving the second acousto-optical deflector so that the second beam component is radiated back in the direction of incidence. These measures cause the first beam component, which strikes the diffraction grating, to return along its own path at any modulation frequency, i.e., at any angle of deflection, with the light path varying with the modulation frequency.

In the interferometric instrument of the present invention, the first acousto-optical deflector and the second acousto-optical deflector are driven by a common deflector driver and information about a modulation frequency is sent to an analysis circuit, which also receives an output signal of a photodetector. The analysis circuit can be used to measure the distance to the measuring point on the test object on the basis of the frequency information and the output signal. Since the light path is directly dependent on the modulation frequency without being subject to inertia, it is always precisely detected, and the position of the test object can be reliably determined.

The interferometric instrument of the present invention also includes a collimator that is positioned between the radiation generating unit and a first beam splitter, while a second beam splitter is located between the first beam splitter and the test object in order to direct the first beam component onto the test object via a focusing lens and to direct the first beam component reflected from the test object to an interference element that is in the form of an additional beam splitter. In addition, a third beam splitter is positioned between the first beam splitter and the first acousto-optical deflector and used to direct the second beam component returning from the first acousto-optical deflector to the additional beam splitter so that the second beam component will interfere with the first beam component reflected from the test object.

BRIEF DESCRIPTION OF THE DRAWING

The figure shows a schematic layout of an interferometric instrument according to the present invention.

DETAILED DESCRIPTION

According to the figure, the interferometric instrument of the present invention includes a briefly coherent radiation unit in the form of a light source 1, such as, for example, an injection laser diode. Light source 1 produces a collimated beam of a briefly coherent radiation through collimator 2. This beam is split into a first beam component 3 and a second beam component 4 by a first beam splitter ST1. First beam component 3 is aimed at the surface of test object 7 via a second beam splitter ST2 and a focusing lens 6, using an acousto-optical modulator 5. After being reflected back, first beam component 3 reaches a fourth beam splitter ST4. Second beam component 4, which was split in first beam splitter ST1, passes through a third beam splitter ST3 and finally through two acousto-optical deflectors 8, 9, which are frequency-modulated by a common deflector driver 12. The frequency modulation causes the deflection angle of second beam component 4 to vary by an angle a in first acousto-optical deflector 8. In second acousto-optical deflector 9, second beam component 4 is subsequently deflected again in a direction in which it strikes first acousto-optical deflector 8. This produces a parallel shift in second beam component 4 as it leaves second acousto-optical deflector 9, with this second beam component 4 subsequently illuminating a reflecting element in the form of a diffraction grating 10. Diffraction grating 10 is inclined at a specific angle so that, regardless of the parallel shift, diffracted first beam component 3 is radiated back to the interferometric arrangement, passing through third beam splitter ST3 and superimposing itself on first beam component 3, coming from test object 7, in beam splitter ST4. The interference contrast reaches its maximum when both beam components 3 and 4 have covered the same optical distance.

Since both acousto-optical deflectors 8, 9 are arranged so that the angular deflection of first acousto-optical deflector 8 is reset in second acousto-optical deflector 9, and the second beam component 4 only shifts in parallel, the light path or optical path (run time) of second beam component 4 is modulated. When the optical path difference between both beam components 3, 4 is zero, a photodetector 11 positioned in the optical path downstream from fourth beam splitter ST4 also detects the interference maximum. The distance to test object 7 can be precisely determined by comparing the time at which the interference maximum or the signal maximum of photodetector 11 is reached with the instantaneous frequency of deflector driver 12 in an analysis circuit 14. When an acousto-optical modulator 5 positioned between first beam splitter ST1 and second beam splitter ST2 is driven in order to shift the frequency of first beam component 3, photodetector 11 detects the interference maximum in the form of an alternating signal having the frequency at which acousto-optical modulator 5 is driven by a modulator driver 13.

What is claimed is:

1. An interferometric instrument for sensing a surface of a test object, comprising:
   a radiation generating unit for emitting a briefly coherent radiation; an
   an arrangement for periodically changing a light path of a received beam component, the arrangement for periodically changing the light path including an acousto-optical deflectors arrangement for producing a parallel shift positioned in at least one of an optical path of a first beam component and an optical path of a second beam component and a stationary reflecting element that receives the received beam component directly from the acousto-optical deflector arrangement;
   a first beam splitter for producing the first beam component and the second beam component in response to the briefly coherent radiation, the first beam component being aimed at the surface of the test object and the second beam component being aimed at the stationary reflecting element;
   an interference element for causing the first beam component reflected from the surface of the test object and the second beam component reflected from the reflecting element to interfere with one another to produce an interfered radiation; and
   a photodetector for receiving the interfered radiation, wherein:
      the acousto-optical deflector arrangement for producing the parallel shift produces the parallel shift by electrically driving according to periodic time intervals at least one of the first beam component and the second beam component supplied thereto, and
      the stationary reflecting element is a grating.

2. The interferometric instrument according to claim 1, wherein the acousto-optical deflector arrangement is frequency-modulated and positioned in relation to the second beam component and to the reflecting element to deflect the optical path of the second beam component in the acousto-optical deflector arrangement.

3. The interferometric instrument according to claim 2, wherein the acousto-optical deflector arrangement includes:
   a first acousto-optical deflector, and
   a second acousto-optical deflector positioned consecutively with respect to the first acousto-optical deflector in the optical path of the second beam component, wherein the first acousto-optical deflector deflects the second beam component around an angle by an angular deflection that is variable over time as a function of a predetermined frequency, wherein the second acousto-optical deflector resets the angular deflection so that the second beam component moves towards the first acousto-optical deflector in a direction of incidence, and wherein the reflecting element includes a diffraction grating oriented at an angle to the second beam component at which the second beam component is radiated back in the direction of incidence.

4. The interferometric instrument according to claim 3, further comprising:
   a common deflector driver for driving the first acousto-optical deflector and the second acousto-optical deflector; and
   an analysis circuit having an input for receiving information about a modulation frequency and an input for receiving an output signal of the photodetector, wherein the analysis circuit determines a distance to a measuring point on the test object on the basis of the information about the modulation frequency and the output signal of the photodetector.

5. The interfereometric instrument according to claim 3, further comprising:
   a collimator positioned between the radiation generating unit and the first beam splitter;
   a focusing lens;
   a second beam splitter for directing the first beam component onto the test object via the focusing lens and for directing the first beam component reflected from the test object onto the interference element, the second beam splitter being located between the first beam splitter and the test object, wherein the interference element is a first additional beam splitter; and
   a third beam splitter positioned between the first beam splitter and the first acousto-optical deflector, the third beam splitter directing the second beam component to the first additional beam splitter as the second beam component returns from the first acousto-optical deflector to the first additional beam splitter in order to cause the second beam component to interfere with the first beam component reflected from the test object.

* * * * *